United States Patent [19]

Massie et al.

[11] 3,821,315

[45] June 28, 1974

[54] PREPARATION OF ETHERS

[75] Inventors: Stephen N. Massie, Palatine; Herman S. Bloch, Skokie, both of Ill.

[73] Assignee: Universal Oil Products Company, Des Plaines, Ill.

[22] Filed: Feb. 22, 1972

[21] Appl. No.: 228,352

[52] U.S. Cl. ...... 260/612 D, 260/614 R, 260/611 R, 260/611 A, 260/612 R
[51] Int. Cl. ............................................. C07c 41/06
[58] Field of Search ......... 260/614 A, 614 R, 612 D

[56] References Cited
UNITED STATES PATENTS

| | | | |
|---|---|---|---|
| 2,162,913 | 6/1939 | Eversole et al. | 260/614 A X |
| 2,797,247 | 6/1957 | Keith | 260/614 A |
| 2,830,090 | 4/1958 | Teter et al. | 260/614 A |
| 3,135,807 | 6/1964 | Grasselli et al. | 260/614 A |

*Primary Examiner*—Bernard Helfin
*Attorney, Agent, or Firm*—James R. Hoatson, Jr.; Raymond H. Nelson; William H. Page, II

[57] ABSTRACT

Symmetrical and unsymmetrical ethers may be prepared by the addition of alcohols to olefins in the presence of a catalyst comprising an organomolybdenum compound at reaction conditions which include a temperature in the range of from about 50° to about 300° C. and a pressure in the range of from about atmospheric to about 100 atmospheres.

9 Claims, No Drawings

PREPARATION OF ETHERS

This invention relates to a process for the preparation of ethers. More specifically the invention is concerned with a process for preparing symmetrical and unsymmetrical ethers by reacting an olefin with an alcohol in the presence of certain catalytic compositions of matter.

Oxygen-containing compounds, and particularly ethers, form valuable articles of commerce. For example, dialkyl ethers either symmetrical or unsymmetrical in configuration will find use as solvents in industry while alkylaryl ethers are used as pharmaceuticals, antiozidants, antiozanants and ultra-violet light stabilizers. For example, an unsymmetrical dialkyl ether such as t-butyl methyl ether, by virtue of its low boiling point, that is, 55° C., and its high blending octane number, namely, 123 (10 percent in 91.4 octane unleaded gasoline), is potentially valuable for compounding in motor fuels such as gasolines and particularly for upgrading unleaded motor fuels.

It is therefore an object of this invention to provide a process for preparing oxygen-containing compounds such as ethers.

Another object of this invention is to provide a process for the preparation of symmetrical or unsymmetrical ethers utilizing alcohols and olefins as starting materials, the process being effected in the presence of certain catalytic compositions of matter.

In one aspect an embodiment of this invention resides in a process for the preparation of an ether which comprises reacting an olefin with an alcohol in the presence of a catalyst consisting of an organomolybdenum compound at reaction conditions, and recovering the resultant ether.

A specific embodiment of this invention is found in a process for the preparation of an ether which comprises reacting isobutylene with methyl alcohol in the presence of molybdenum oxalate at a temperature in the range of from 50° to about 300° C. and a pressure in the range of from about atmospheric to about 100 atmospheres, and recovering the resultant t-butyl methyl ether.

Other objects and embodiments will be found in the following further detailed description of the present invention.

As hereinbefore set forth the present invention is concerned with a process for preparing ethers which may be dialkyl, arylarylalkyl or alkylaryl, the dialkyl ethers being symmetrical or unsymmetrical in nature. Specifically speaking the preparation of these ethers is accomplished by the addition of alcohols to olefins in the presence of certain organomolybdenum catalysts, particularly organomolybdenum compounds in which the molybdenum may be in a higher valence state or in a valence state of zero. Specific examples of these catalysts comprising an organomolybdenum compound will be hereinafter set forth in greater detail.

Examples of olefins which may be employed as one of the starting materials of the present process include both normally gaseous and normally liquid olefins containing from two up to about 16 carbon atoms such as the open chain olefins including ethylene, propylene, 1-butene, isobutylene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, the isomeric undecenes, do-decenes, tridecenes, tetradecenes, pentadecenes, hexadecenes as well as branched chained isomers of the normal olefins, cyclopentene, cyclohexene, cycloheptene, aryl-substituted alkenes such as allylbenzene, etc.

Examples of alcohols which may be utilized in the reaction with the aforementioned olefins will include aliphatic alcohols such as methyl alcohol, ethyl alcohol, propyl alcohol, isopropyl alcohol, n-butyl alcohol, sec-butyl alcohol, n-amyl alcohol, sec-amyl alcohol, n-hexyl alcohol, isohexyl alcohol, n-heptyl alcohol, isoheptyl alcohol, n-octyl alcohol, the isomeric isooctyl alcohols, the isomeric nonyl alcohols, etc. hydroxy substituted aromatic compounds such as phenol, o-cresol, m-cresol, p-cresol, benzyl alcohol, 2-phenylethyl alcohol, 3-phenylpropyl alcohol, 4-phenylbutyl alcohol, etc. It is to be understood that the aforementioned olefins and alcohols are only representative of the classes of compounds which may be employed as reactants, and that the present invention is not necessarily limited thereto.

The catalysts which are to be employed to effect the addition of the alcohols to the olefins will comprise organomolybdenum compounds in which the molybdenum is present in a zero valence state or in a higher valence state. Some representative examples of these compounds will include the carbonyl compounds of zero valence molybdenum (which, for the purpose of this invention, are defined as organomolybdenum compounds) such as molybdenum hexacarbonyl, tris-(acetonitrile) molybdenum tricarbonyl, benzene molybdenum tricarbonyl, toluene molybdenum tricarbonyl, o-xylene molybdenum tricarbonyl, m-xylene molybdenum tricarbonyl, p-xylene molybdenum tricarbonyl, hemi-mellitine molybdenum tricarbonyl, pseudocumene molybdenum tricarbonyl, mesitylene molybdenum tricarbonyl, prehnitene molybdenum tricarbonyl, isodurene molybdenum tricarbonyl, durene molybdenum tricarbonyl, etc., and the stable salts at the high oxidation states such as molybdenum oxalate $(H_2(MoO_3C_2O_4)H_2O)$ molybdenyl acetylacetonate, etc. It is to be understood that the aforementioned examples of molybdenum in a zero valence state and in a high valence state are only representative of the class of catalytic compounds which may be used, and that the present invention is not necessarily limited thereto.

The aforementioned addition of the alcohols to the olefin in the presence of a catalyst comprising an organomolybdenum compound will be effected at reaction conditions which include an elevated temperature in the range of from about 50° to about 300° C. and at a pressure in the range of from about atmospheric up to about 100 atmospheres or more. When utilizing superatmospheric pressures as one of the reaction conditions, the pressure may be generated by the autogenous pressure of the olefin, if in the gaseous state. However, if both of the starting materials are in liquid state, said superatmospheric pressures may be provided by the introduction of a substantially inert gas such as nitrogen into the reaction zone, the amount of pressure which is used being that which is sufficient to maintain a major portion of the reactants in a liquid phase.

The process of this invention may be effected in any suitable manner and may comprise either a batch or continuous type operation. For example, when a batch type operation is used, the alcohol and the catalyst are placed in an appropriate apparatus such as, for example, an autoclave of the rotating or mixing type. Thereafter the olefin, whether in gaseous or liquid form, is charged to the reactor which is thereafter heated to the desired operating temperature, the super-atmospheric pressure being afforded by the olefin if in gaseous form. Alternatively speaking, if the olefin is in liquid form and super-atmospheric pressures are desired, said pressure is provided for by the introduction of nitrogen into the reactor prior to heating to the desired temperature. After maintaining the reactor at the desired operating conditions for a residence time which may range from about 0.5 up to about 20 hours or more in duration, heating is discontinued and the reactor and contents thereof are allowed to return to room temperature. Any excess pressure which may still be present is discharged and the reaction mixture is recovered. The mixture, after being separated from the catalyst by conventional means such as filtration when the catalyst remains as a solid after the reaction, is then subjected to conventional means of separation which may include washing, drying, extraction, fractional distillation, fractional crystallization, etc. whereby the desired ether is separated from any unreacted starting materials and/or side reaction products which may have formed and is recovered.

It is also contemplated within the scope of this invention that the process of this invention may be effected in a continuous manner of operation. When this type of operation is employed a quantity of the organomolybdenum compound is placed in an appropriate apparatus which is maintained at the proper operating conditions of temperature and pressure. The reactants comprising an olefin and an alcohol are continuously charged to this reactor through separate lines, or if so desired, they may be admixed prior to entry into said reactor and charged thereto in a single stream. Upon completion of the desired residence time in the reactor, the reactor effluent is continuously withdrawn and subjected to separation means of the type hereinbefore set forth in greater detail whereby the desired ether is separated and recovered, the unreacted starting materials being recycled to form a portion of the feed stock. If the organomolybdenum compound which is to be used as a catalyst is in solid form, it is possible to effect a continuous manner of operation in a number of ways. One way is to employ the catalyst as a fixed bed in the reactor and pass the reactant through the catalyst bed in either an upward or downward flow. Another method of effecting the present process is to utilize the catalyst as a moving bed in the reactor and pass the reactant and the catalyst either concurrently or countercurrently to each other through the reactor. Alternatively the catalyst may also be charged to the reactor as a slurry or in solution in one or both of the starting materials.

Examples of symmetric and unsymmetric dialkyl, arylaralkyl or alkylaryl ethers which may be prepared according to the process of this invention will include ethyl methyl ether, isopropyl methyl ether, sec-butyl methyl ether, t-butyl methyl ether, sec-amyl methyl ether, sec-hexyl methyl ether, sec-heptyl methyl ether, sec-octyl methyl ether, sec-nonyl methyl ether, sec-decyl methyl ether, diethyl ether, propyl ethyl ether, sec-butyl ethyl ether, t-butyl ethyl ether, n-amyl ethyl ether, sec-amyl ethyl ether, n-hexyl ethyl ether, sec-hexyl ethyl ether, n-heptyl ethyl ether, sec-heptyl ethyl ether, n-octyl ethyl ether, sec-octyl ethyl ether, n-nonyl ethyl ether, sec-nonyl ethyl ether, n-decyl ethyl ether, sec-decyl ethyl ether, diisopropyl ether, isopropyl n-propyl ether, sec-butyl n-propyl ether, t-butyl n-propyl ether, sec-amyl propyl ether, sec-hexyl propyl ether, sec-heptyl propyl ether, sec-octyl propyl ether, sec-nonyl propyl ether, sec-decyl propyl ether, t-butyl 2-methyl-1-propyl ether, ethyl phenyl ether, isopropyl phenyl ether, sec-butyl phenyl ether, t-butyl phenyl ether, t-amyl phenyl ether, sec-amyl phenyl ether, t-hexyl phenyl ether, ethyl benzyl ether, isopropyl benzyl ether, sec-butyl benzyl ether, t-butyl benzyl ether, ethyl p-tolyl ether, isopropyl p-tolyl ether, t-butyl p-tolyl ether, ethyl o-tolyl ether, isopropyl o-tolyl ether, t-butyl o-tolyl ether, ethyl m-tolyl ether, isopropyl m-tolyl ether, t-butyl m-tolyl ether, etc. In the preferred embodiments of this invention, primary alcohols are reacted with 1,1-dialkylethylenes or 1,1,2-trialkylethylenes to form primary-alkyl tertiary-alkyl ethers.

The following examples are given to illustrate the process of the present invention, which, however, are not intended to limit the generally broad scope of the present invention in strict accordance therewith.

EXAMPLE I

In this example 64 g. (2.0 mole) of methyl alcohol and 1 g. of molybdenum oxalate ($H_2(MoO_3C_2O_4)H_2O$) were charged to the glass liner of a rotating autoclave. The glass liner was sealed into the autoclave and flushed with nitrogen. Following this 112 g. (2.0 moles) of isobutylene were added and the autoclave was pressured with an additional 35 atmospheres of nitrogen. Thereafter the autoclave was heated to a temperature of 180° C. and maintained thereat for a period of 16 hours. Upon completion of the 16-hour period, heating was discontinued and the autoclave allowed to return to room temperature. The excess pressure was discharged, the autoclave was opened and the reaction mixture was recovered therefrom. The mixture was separated from the catalyst which was recovered as a dark blue powder and the liquid was then subjected to gas-liquid chromatography analysis. It was determined that there had been a 25 percent conversion to t-butyl methyl ether, the ether being formed in almost 100 percent selectivity.

EXAMPLE II

The above experiment was repeated by charging 64 g. (2.0 mole) of methyl alcohol and 1 g. of a catalyst comprising molybdenyl acetylacetonate to the glass liner of a rotating autoclave. The autoclave was sealed and 112 g. (2.0 mole) of isobutylene was charged to the reactor after the reactor had been flushed with nitrogen. An additional 35 atmospheres of nitrogen was pressed into the autoclave which was thereafter heated to a temperature of 180° C. After maintaining the autoclave and contents thereof at this temperature for a period of 16 hours heating was discontinued, the autoclave was allowed to return to room temperature and the excess pressure was discharged therefrom. The autoclave was opened and the reaction mixture recovered. After separation from the catalyst by filtration, the mixture was subjected to gas-liquid chromatographic analysis which disclosed a 48 percent yield of t-butyl methyl ether based on methanol charged and 60 percent yield based on methanol consumed.

EXAMPLE III

In this example 32 g. (1.0 mole) of methyl alcohol and 1 g. of molybdenum hexacarbonyl were placed in the glass liner of a rotating autoclave and treated in a manner similar to that set forth in the above example, that is, by charging 56 g. (1.0 mole) of isobutylene to the reactor and pressuring the reactor to 35 atmospheres with nitrogen. After allowing the reaction to proceed for a period of 16 hours at a temperature of 180° C., heating was discontinued, the autoclave was allowed to return to room temperature, and the excess pressure was discharged. The reaction mixture was recovered, separated from the catalyst and subjected to gas-liquid chromatographic analysis, said analysis disclosing a 16 percent yield of t-butyl methyl ether.

EXAMPLE IV

In this example 32 g. (1.0 mole) of methyl alcohol and 1 g. of molybdenum oxalate are placed in the glass liner of a rotating autoclave. The autoclave is sealed, flushed with nitrogen and 42 g. (1.0 mole) of propylene is charged thereto. Thereafter the autoclave is further pressured with 35 atmospheres of nitrogen and heated to a temperature of 180° C. After maintaining the autoclave at this temperature for a period of 16 hours, the reaction is discontinued and the autoclave allowed to return to room temperature. The excess pressure is discharged, the autoclave is opened and the reaction mixture is recovered therefrom. After separation from the catalyst by filtration, the liquid product is subjected to gas-liquid chromatographic analysis which shows the presence of isopropyl methyl ether.

EXAMPLE V

A mixture of 47 g. (0.5 mole) of phenol and 1 g. of molybdenum acetylacetonate was placed in the glass liner of a rotating autoclave. The autoclave was sealed, flushed with nitrogen and 56 g. (1.0 mole) of isobutylene charged thereto. The autoclave was then pressured with 35 atmospheres of nitrogen, heated to a temperature of 180° C. and maintained thereat for a period of 16 hours. At the end of this time heating was discontinued and the autoclave allowed to return to room temperature. The excess pressure was discharged and the reaction mixture, after recovery from the autoclave, was treated in a manner similar to that hereinbefore set forth. A gas-liquid chromatographic analysis of the product disclosed the presence of t-butyl phenyl ether.

EXAMPLE VI

In like manner 50 g. (1.0 mole) of n-propyl alcohol and 1 g. of molybdenum hexacarbonyl are placed in a glass liner of a rotating autoclave which is thereafter sealed and flushed with nitrogen. Following this 56 g. (1.0 mole) of isobutylene is charged to the reactor followed by a sufficient amount of nitrogen so that an initial operating pressure of 35 atmospheres is reached. The autoclave is then heated to a temperature of 180° C. and maintained thereat for a period of 12 hours. At the end of this time, heating is discontinued, the autoclave is allowed to return to room temperature and the excess pressure is discharged. The autoclave is opened, the reaction mixture is recovered therefrom and separated from the catalyst by means of filtration. A gas-liquid chromatographic analysis of the liquid product discloses the presence of t-butyl n-propyl ether.

EXAMPLE VII

A mixture of 74 g. (1.0 mole) of 2-methyl-1-propanol isobutyl alcohol) and 1 g. of molybdenyl acetylacetonate was placed in the glass liner of a rotating autoclave and 112 g. (2.0 mole) of isobutylene was charged thereto. No additional pressure was added prior to heating the autoclave at 140°. After maintaining the autoclave at this temperature for a period of 16 hours, heating was discontinued, the autoclave was allowed to return to room temperature and the excess pressure was discharged therefrom. The reaction mixture was recovered and separated from the catalyst by conventional means. Following this the liquid product was distilled to produce t-butyl isobutyl ether (1,1-dimethylethyl 2-methyl-1-propyl ether), as confirmed by NMR AND IR analyses.

We claim as our invention:

1. A process for the preparation of an ether which comprises reacting an olefin of from two to about 16 carbon atoms with either an aliphatic alcohol of from one to nine carbon atoms or phenol at a temperature of from about 50° to about 300° C. and a pressure of from about atmospheric to about 100 atmospheres in contact with a molybdenum compound selected from the group consisting of molybdenum oxalate, molybdenyl acetylacetonate, molybdenum hexacarbonyl, tris-(acetonitrile) molybdenum tricarbonyl, benzene molybdenum tricarbonyl, toluene molybdenum tricarbonyl, o-xylene molybdenum tricarbonyl, m-xylene molybdenum tricarbonyl, p-xylene molybdenum tricarbonyl, hemimellitine molybdenum tricarbonyl, pseudocumene molybdenum tricarbonyl, mesitylene molybdenum tricarbonyl and durene molybdenum tricarbonyl.

2. The process as set forth in claim 1 in which said molybdenum compound is molybdenum oxalate.

3. The process as set forth in claim 1 in which said molybdenum compound is molybdenum hexacarbonyl.

4. The process as set forth in claim 1 in which said molybdenum compound is molybdenyl acetylacetonate.

5. The process as set forth in claim 1 in which said olefin is isobutylene, said alcohol is methyl alcohol and said ether is t-butyl methyl ether.

6. The process as set forth in claim 1 in which said olefin is propylene, said alcohol is methyl alcohol and said ether is methyl isopropyl ether.

7. The process as set forth in claim 1 in which said olefin is 1-butene, is reacted with phenol and said ether is sec butyl phenyl ether.

8. The process as set forth in claim 1 in which said olefin is isobutylene, said alcohol is n-propyl alcohol and said ether is t-butyl n-propyl ether.

9. The process as set forth in claim 1 in which said olefin is isobutylene, said alcohol is isobutyl alcohol and said ether is t-butyl isobutyl ether.

* * * * *